United States Patent [19]

Funahashi et al.

[11] Patent Number: 5,233,438
[45] Date of Patent: Aug. 3, 1993

[54] ENTERTAINMENT APPARATUS FOR PRODUCING ORCHESTRAL MUSIC ACCOMPANIMENT AND A SELECTED BACKGROUND VIDEO

[75] Inventors: Yasuhiro Funahashi, Nagoya; Yasutada Aoyama, Inazawa; Toshinori Taniuchi, Mie; Ryuji Sekiya, Nagoya, all of Japan

[73] Assignee: Brother Kogyo Kabushiki Kaisha, Aichi, Japan

[21] Appl. No.: 663,672

[22] Filed: Mar. 4, 1991

[30] Foreign Application Priority Data

Mar. 2, 1990 [JP] Japan .................................. 2-52461
Jun. 19, 1990 [JP] Japan ................................ 2-160546

[51] Int. Cl.⁵ .................................................. H04N 5/78
[52] U.S. Cl. .................................... 358/341; 358/335; 358/343; 358/311; 358/342; 360/19.1
[58] Field of Search ............... 358/335, 341, 342, 343, 358/311, 906; 360/14.1, 14.2, 14.3, 33.1, 19.1, 55

[56] References Cited

U.S. PATENT DOCUMENTS

| | | | |
|---|---|---|---|
| 4,519,008 | 5/1985 | Takenouchi et al. | 360/33.1 |
| 4,688,105 | 8/1987 | Block et al. | 358/342 |
| 4,777,537 | 10/1988 | Ueno et al. | 358/341 |
| 4,992,886 | 2/1991 | Klappert | 358/341 |
| 5,062,097 | 10/1991 | Kumaoka | 358/335 |
| 5,099,337 | 3/1992 | Cury | 358/335 |
| 5,131,311 | 7/1992 | Murakami et al. | |

*Primary Examiner*—Tommy Chin
*Assistant Examiner*—Huy Nguyen
*Attorney, Agent, or Firm*—Oliff & Berridge

[57] ABSTRACT

An entertainment apparatus includes a loudspeaker for producing an orchestral background for singer's accompaniment and a TV monitor for displaying a background video relevant to a song sang by the singer. In a compact disk, accompaniment data and corresponding song text data are recorded with respect to each of a plurality of songs, and in a video disk, stored are a plurality of background video data each being used in conjunction with a song selected. When a desired song is selected, its accompaniment data and the corresponding song text data are read from the compact disk and one of the plurality of background video data is read from the video disk. The song text data is superimposed on the background video data so that the song text and the background video are superimposedly displayed on the TV monitor. In synchronous with the display on the TV monitor, the accompaniment data is reproduced from the loudspeaker to give an orchestral background for singers.

14 Claims, 6 Drawing Sheets

| 30 | 31 | 32 |
|---|---|---|
| 1 | LOVE | 1,2 |
| 2 | KISS | 3,4 |
| 3 | GOODBYE | 5,6 |
| 4 | DREAM | 7,8 |
| 5 | MEMORY | 9,10 |
| 6 | PEACE | 11,12 |
| 7 | SEASON | 13,14 |
| ... | ... | ... |
| 37 | FAMILY | 73,74 |
| 38 | CHILDREN | 75,76 |
| 39 | DANCE | 77,78 |
| 40 | CHRISTMAS | 79,80 |

FIG. 8B

| 33 | 34 |
|---|---|
| IMAGINE | 4,6 |
| FIRST OF MAY | 38,40 |
| KISS AND SAY GOODBYE | 2,3 |
| SATURDAY NIGHT FEVER | 1,39 |
| THE DAY WE WERE | 3,5 |
| IF | 1,4 |
| ... | ... |
| WHITE CHRISTMAS | 40 |
| ⋮ | ⋮ |

ENTERTAINMENT APPARATUS FOR PRODUCING ORCHESTRAL MUSIC ACCOMPANIMENT AND A SELECTED BACKGROUND VIDEO

BACKGROUND OF THE INVENTION

The present invention relates to a musical entertainment apparatus including a loudspeaker for producing an orchestral background for singer's accompaniment and a TV monitor for displaying a background video relevant to a song sang by the singer.

Recorded video signals with orchestral music as an orchestral background for singers, a form of entertainment known as "karaoke", are usually provided with superimposed song test. An apparatus to this effect will hereinafter be referred to as "entertainment apparatus".

In order to speed up the searches of the background video and the song selected by an entertainer to sing, and due to a large quantity of background video data and music data, the background video and orchestral music accompaniment have usually been recorded on the same video disk together with song text to be superimposed on the background video. The video data and the music accompaniment data are recorded in linkage in order that the background video and the orchestral music accompaniment may be reproduced in sync with each other. The background video and the song text to be superimposed thereon are also recorded in linkage. Therefore, the same background video always appears on the TV monitor whenever the same song is selected for entertainment. Replacement of the background video for the same song cannot be achieved. In this respect, the conventional entertainment apparatus is not satisfactory, since there is a command that a desired background video be selected depending upon the user's preference.

For the entertainment apparatus of commercial use, it is necessary that a number of video disks be stocked and for the sake of a user's unlimited selection of songs, new video disks should be supplemented to cover new songs. To do so, the owner of the apparatus has heavy expense to bear, and on the other hand it is burdensome for the disk manufacturers in producing a; new video suitable for the new song.

As a solution for such problems, it has been proposed to use a still picture instead of a moving video, as disclosed in Japanese Laid-Open Patent Publication No. 60-214178. However, the use of a still picture while one is singing a song, which typically continues for a few minutes, is monotonous and thus unsatisfactory.

SUMMARY OF THE INVENTION

The present invention has been made to solve the aforementioned problems, and it is an object of the invention to provide an entertainment apparatus which allows the user to select a desired background video with respect to a song text.

Another object of the invention is to provide an entertainment apparatus in which disks containing only orchestral musical accompaniments of new songs can be used in conjunction with existing background videos.

Still another object of the invention is to provide an entertainment apparatus which reduces expense which the owner has to bear.

Figure 1:
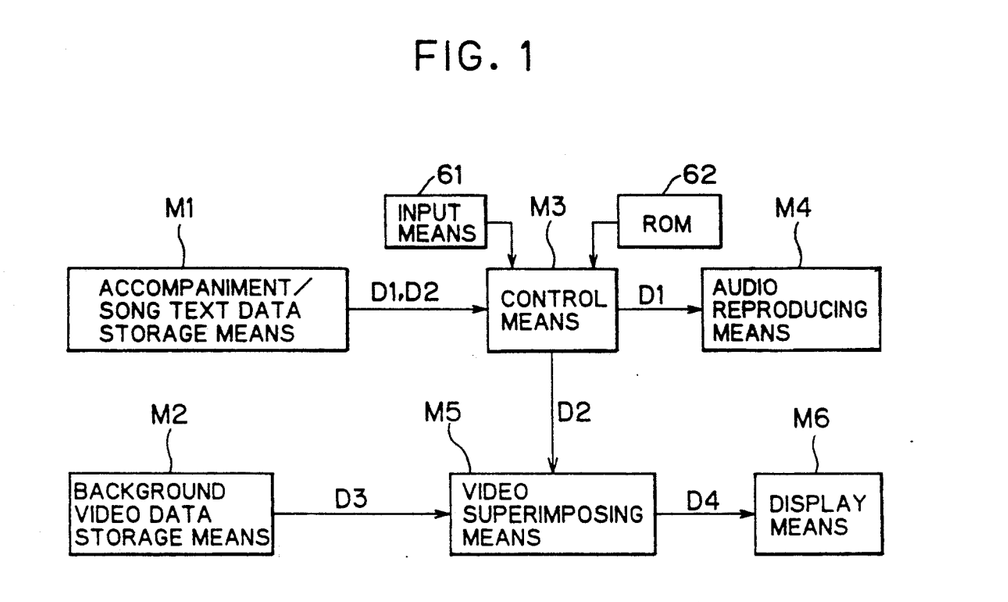
FIG. 1 is a block diagram for description of inventive concept according to one aspect of the present invention.

To achieve the above and other objects, in accordance with one aspect of the present invention, there is provided an entertainment apparatus which comprises, as shown in FIG. 1, accompaniment/song text data storage means (M1) for storing accompaniment data D1 and corresponding song text data D2 with respect to each of a plurality of songs; background video data storage means (M2) for storing a plurality of background video data D3, each being used in conjunction with a song; control means (M3) for synchronously reading accompaniment data D1 and its corresponding song text data D2 with respect to a selected song out of the accompaniment/song text data storage means (M1) and for reading selected background video data D3 out of the background video data storage means (M2); input means 61 for providing operator interaction with control means M3; ROM 62 for additional memory capability; audio reproducing means (M4) for audibly reproducing the accompaniment data D1 read by the control means (M3); video superimposing means (M5) for superimposing the song text data D2 read by the control means (M3) on the selected background video data D3 to produce superimposed video data D4; and display means (M6) for visibly displaying the superimposed video data D4.

In the above arranged entertainment apparatus, the accompaniment data D1 and the corresponding song text data D2 have been stored in the accompaniment-/song text data storage means M1 for a plurality of songs, and a plurality of background video data D3 have been stored in the separate background video data storage means M2. The accompaniment data D1 read by the control means M3 from the accompaniment-/song text data storage means M1 is sent to the audio reproducing means M4. On the other hand, the song text data D2 read from the accompaniment/song text data storage means M1 and the background video data D3 read from the background video data storage means M2 are both sent to the video superimposing means M5 where the song text data D2 are superimposed on the background video data D4 which in turn is sent to the display means M6. In this manner, since the song text data D2 and the background video data D3 are separately stored in different storage means M1 and M2 although superimposedly displayed on the display means M6, the background video data D3 can be treated independently of the song text data.

The above and other objects, features and advantages of the present invention will become more apparent from the following description when taken in conjunction with the accompanying drawings in which preferred embodiments of the present invention are shown by way of illustrative examples.

DETAILED DESCRIPTION OF THE PREFERRED EMBODIMENTS

Figure 2:
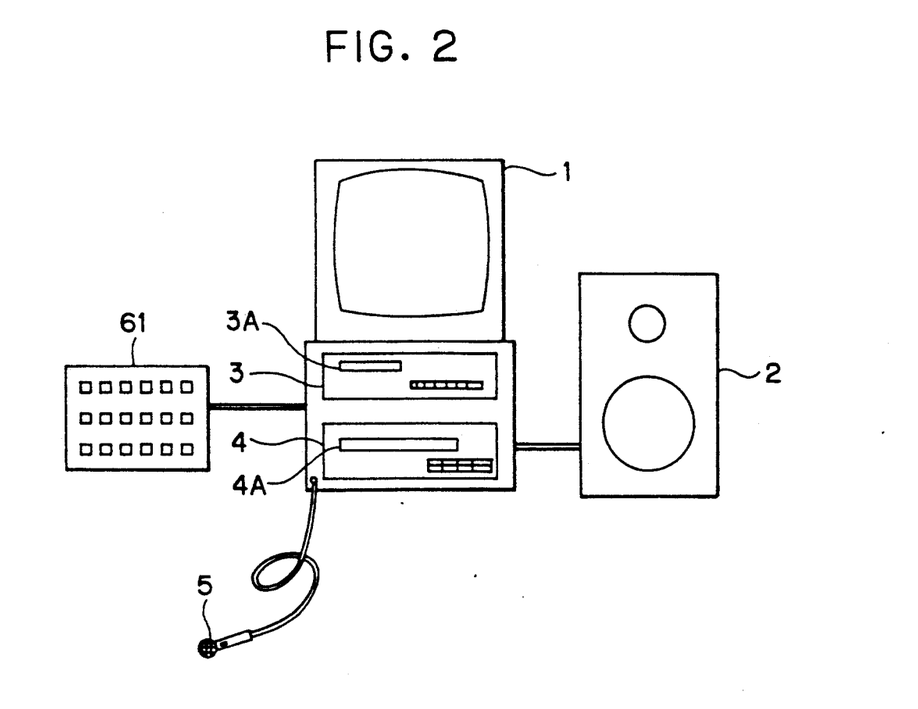
FIG. 2 is a schematic front view showing the entertainment apparatus of the present invention.

FIG. 2 shows an outline of an entertainment apparatus of the present invention which includes a TV monitor 1 for displaying a background video and a song text superimposed thereon, a loudspeaker 2 for producing an orchestral accompaniment on which a singing voice is superimposed, a compact disk (CD) player 3 for reproducing compact disks 3A containing plural pieces of music, a video disk (VD) player 4 for reproducing background video contained in video disks 4A, an input device 61, such as a keyboard, for operator interaction in selecting data such as songs and background video data, and a microphone 5 for picking up a singer's voice. Although not shown therein, the entertainment apparatus further includes an input means for use in selecting a desired song, and various kinds of circuits for processing outputs from the compact disk player 3 and the video disk player 4.

Figure 3:
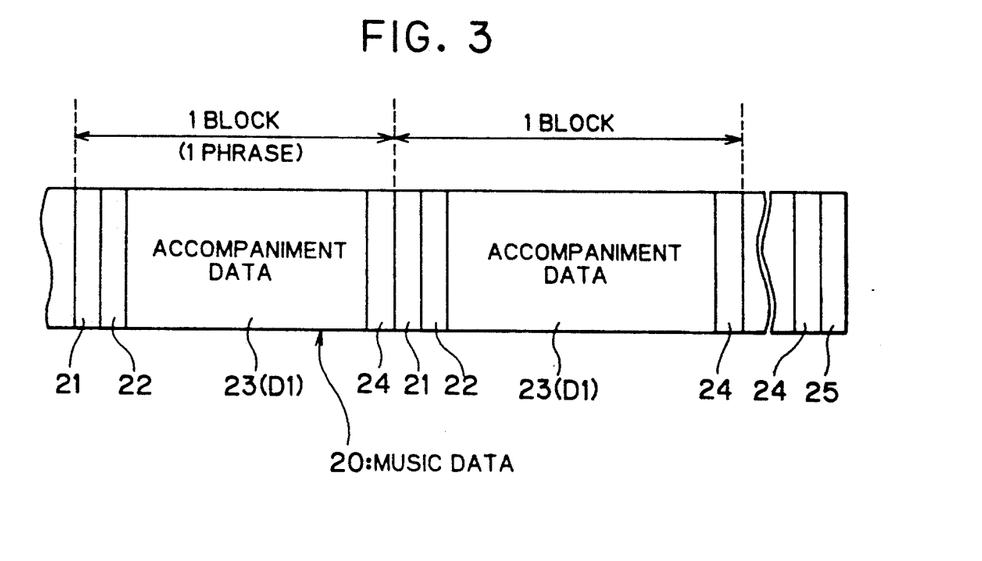
FIG. 3 shows a format of music data.
Figure 4:
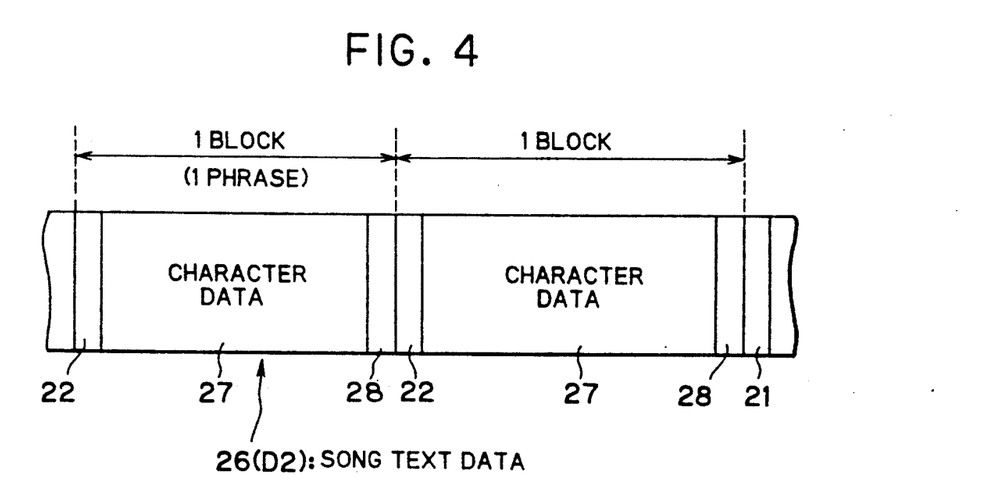
FIG. 4 shows a format of song text data.

The compact disk 3A to be loaded in the compact disk player 3 stores music data and song text data. The format of the music data is shown in FIG. 3 and that of song text data is shown in FIG. 4. The music data includes a plurality of blocks, each being composed of song text display ON code 21, song text data index number 22, accompaniment data 23, and song text display OFF code 24. A music end code 19 is followed by the song text display OFF code of the last block. The song text data 26 also includes an equal plurality of blocks, each being composed of song text index number 22, character data 27, and song text data end code 28.

The song text data index number 22 are common to both the music data 20 and the song text data 26. The respective blocks of both the music data 20 and the song text data 26 are made to correspond to each other. One block of the song text data 26 has a data length corresponding to a horizontally displayable length on the screen of the TV monitor 1. One block of each of the music data 20 and the song text data 26 corresponds to one phrase of the song.

The music data 20 and the song text data 26 have been stored in the compact disk 3A which serves as an accompaniment/song text data storage means M1. It is to be noted that the compact disks 3A are in the form of compact disk-ROM.

Figure 5:
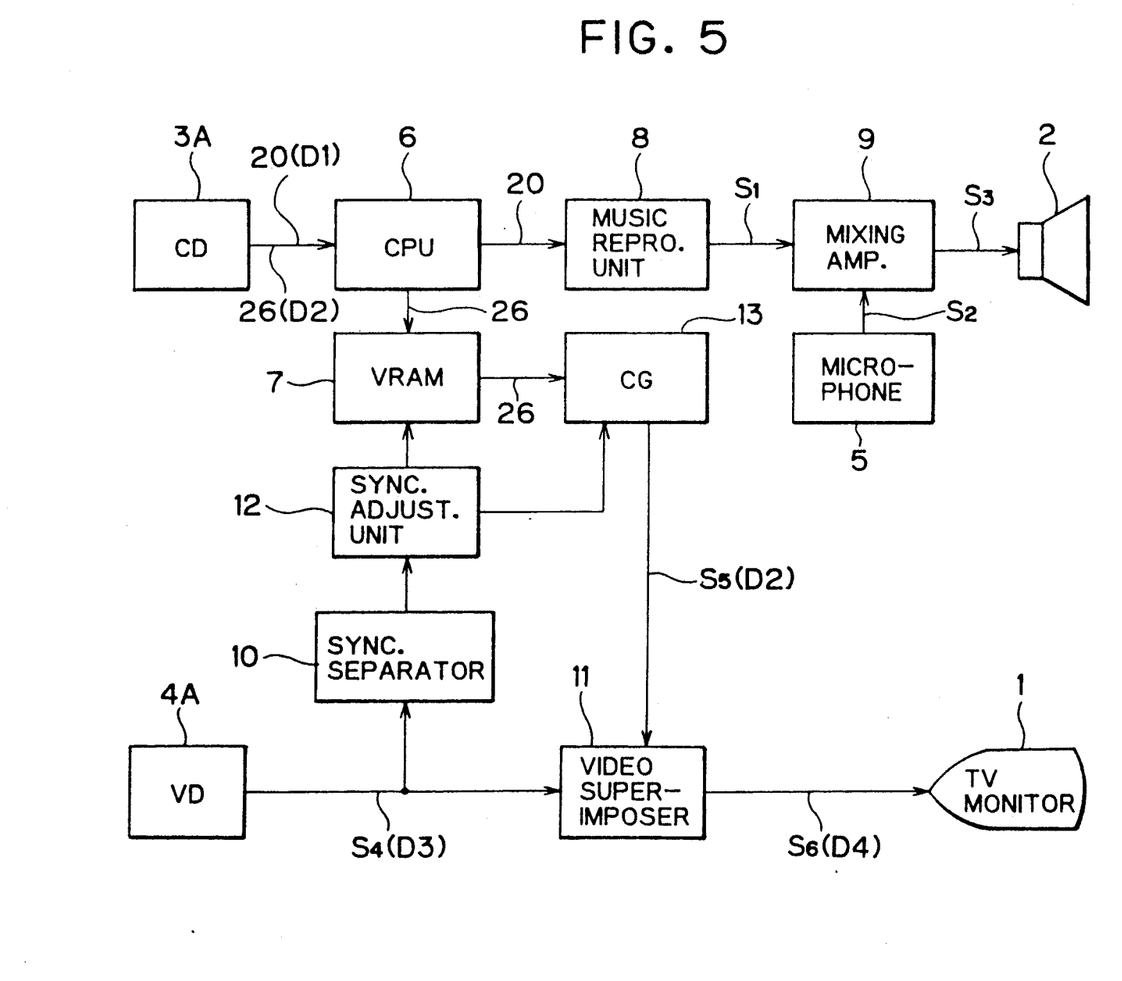
FIG. 5 is a block diagram showing an arrangement of the entertainment apparatus according to one embodiment of the present invention.

FIG. 5 shows in block form an arrangement of the entertainment apparatus. A central processing unit (CPU) 6 synchronously reads both the music data 20 and the song text data 26 out of the compact disk 3A on phase-by-phase basis. One phrase of the song text data 26 is written into a video RAM (VRAM) 7, and one phrase of the music data 20 is supplied to a music reproducing unit 8. The CPU 6 serves as a control means M3.

The music reproducing unit 8 serves to convert the accompaniment data 23 contained in the music data 20 into an analog accompaniment audio signal $S_1$ and the latter signal is supplied to a mixing amplifier 9. The microphone 5 for picking up the singer's singing voice is connected to the mixing amplifier 9 so that a voice signal $S_2$ from the microphone 5 is applied to the mixing amplifier 9. The mixing amplifier 9 mixes and amplifies the accompaniment audio signal $S_1$ and the voice signal $S_2$ and supplies the resultant mixed signal $S_3$ to the loudspeaker 2 from which singing voice accompanied by the orchestral background is emanated. The music reproducing unit 8, the mixing amplifier 9, the microphone 5, and the loudspeaker 2 serve as an audio reproducing means M4.

The video disk 4A stores background video data D3 which is read by the video disk player 4 and converted into an analog background video signal $S_4$. The signal $S_4$ is supplied to both a synchronization separator 10 and a video superimposer 11. The video disk 4A serves as a background video data storage means M2.

The synchronization separator 10 separates both horizontal and vertical synchronization signals from the background video signal $S_4$ and supplies the synchronization signals to a synchronization adjusting unit 12. The synchronization adjusting unit 12 controls both the VRAM 7 and a character generator (CG) 13 based on the synchronization signals, wherein the song text data 26 is read out of the VRAM 7 and the read data is transferred to the character generator 13 from which a song text video signal $S_5$ is produced based on the character data 27 contained in the song text data 26.

The video superimposer 11 superimposes the song text video signal $S_5$ on the background video signal $S_4$ inputted from the video disk 4A to produce a superimposed video signal $S_6$, which is supplied to the TV monitor 1. The video superimposer 11 serves as a video superimposing means M5, and the TV monitor 1 as a display means.

Figure 6:
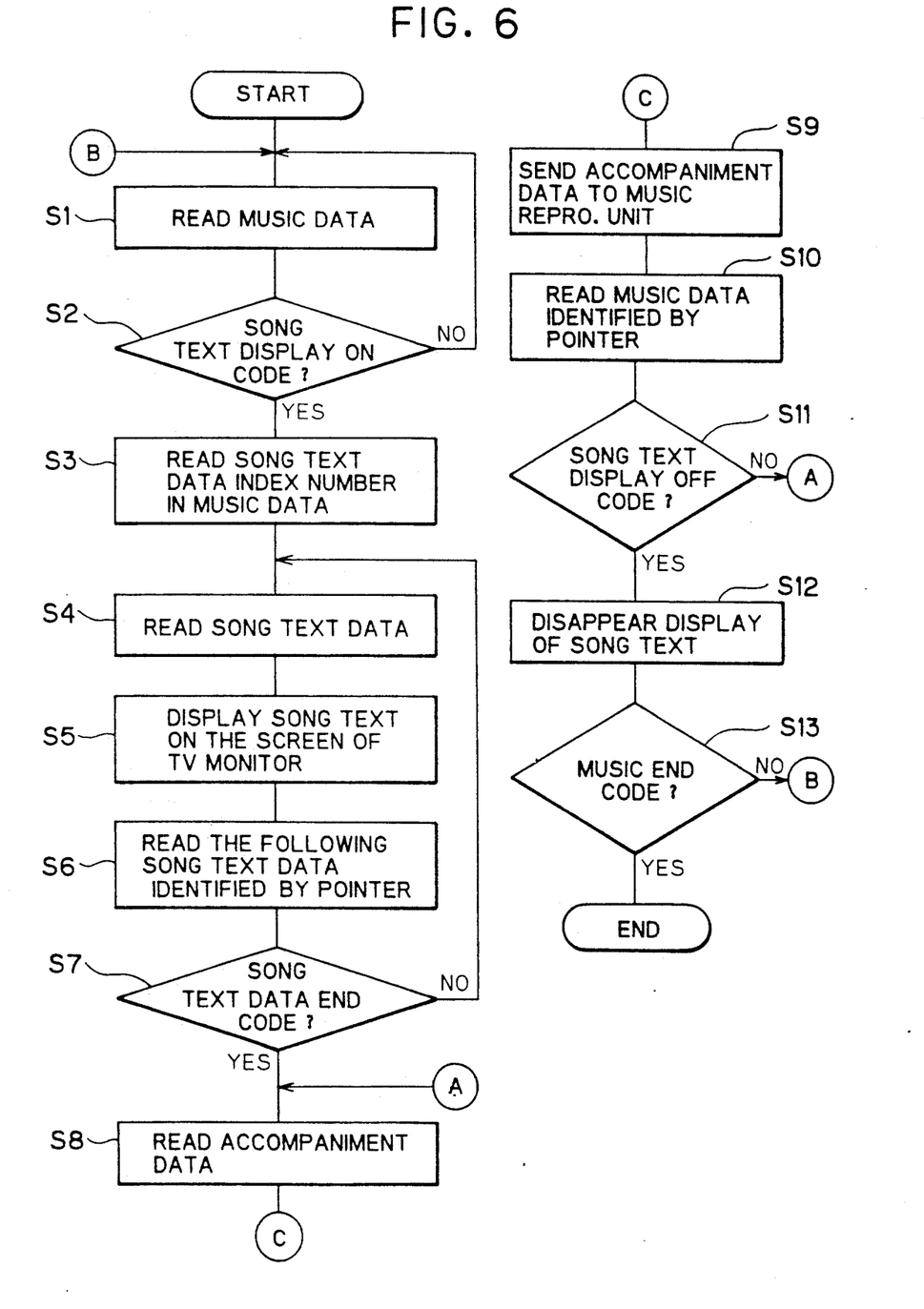
FIG. 6 is a flow chart for description of operation of the apparatus shown in FIG. 5.

Operation of the entertainment apparatus thus arranged will next be described with reference to a flow chart shown in FIG. 6. The processing the routine shown in the flow chart is executed by the CPU 6.

The CPU 6 reads the music data 20 out of the compact disk 3A (step S1), and determines whether the read data is the song text display ON code 21 (step S2). If no, reading of the music data 20 is continued until the song text display ON code 21 is read. When the song text display ON code 21 is read, the following song text data index number 22 is read (step S3). Then, based on the song text data index number 22, the song text data 26 identified by the same song text data index number 21 is read, and the song text data 26 thus read is sequentially written into the VRAM 7 (step S4).

On the other hand, the synchronization separator 10 separates the synchronization signals from the background video signal $S_4$ outputted from the video disk 4A, and outputs the separated synchronization signals to the synchronization adjusting unit 12. Based on the synchronization signals, the synchronization adjusting unit 12 sequentially reads the song text data 26 out of the VRAM 7 and transfers the read data to the character generator 13. The character generator 13 generates the song text video signal $S_5$ based on the character data 27 contained in the received song text data 26 and sends the signal $S_5$ to the video superimposer 11.

The video superimposer 11 synchronously superimposes the song text video signal $S_5$ received from the character generator 13 on the background video signal $S_4$ received from the video disk 4A, and sends the resultant superimposed video signal $S_6$ to the TV monitor 1. As a result, the background video and the song text characters which are in synchronous relation to each other are superimposedly displayed on the screen of the TV monitor 1 (step S5).

Next, the CPU 6 reads the following song text data identified by a pointer (step S6), and determines whether the data identified by the pointer is song text data end code 28 (step S7). If no, the CPU 6 further reads from the compact disk 3A the song text data 26 on the same block and writes the read data in the VRAM 7 (step S4). The song text video signal $S_5$ is derived from the character data 27, and thereafter the background video and the song text characters are superimposedly displayed on the screen of the TV monitor 1 (step S5). The following song text data identified by the pointer is read (step S6), and the CPU 6 again determines whether the data identified by the pointer is song text data end code 28 (step S7).

When the song text data end code 21 is read out, the song text data covering an entire one block has been written in the VRAM 7, and the background video together with a one line song text has been displayed on the screen of the TV monitor 1.

Upon detection of the song text data end code 28, the CPU 6 reads the accompaniment data 23 contained in the music data 20 out of the compact disk 3A (step S8), and sequentially sends the accompaniment data 23 to the music reproducing unit 8 (step S9). The music reproducing unit 8 converts the accompaniment data 20 into the analog accompaniment audio signal $S_1$ and sends the latter signal to the mixing amplifier 9. The mixing amplifier 9 amplifies the signal $S_1$ and outputs the amplified signal to the loudspeaker 2 so that accompaniment music is produced therefrom.

The CPU 6 reads the music data 20 identified by the pointer (step S10), and determines whether the data identified by the pointer is the song text display OFF code 24 (step S11). If no, the CPU 6 further reads the following accompaniment data 23 in the same block of the music data 20 (step S8), sends the read data to the music reproducing unit 8 (step S9), reads the music data identified by the pointer (step S10), and then determines whether the song text display OFF code 24 is read (step S11).

When the song text display OFF code 24 is read, the background video displayed on the TV monitor 1 is disappeared (step S12). Next, it is determined whether the read data is the music end code 25 or not (step S13). If no, the following phrase or block in the music data 20 is read and the processings in steps S1 through S13 are repeatedly executed. The above processings end when the CPU 6 reads the music end code 25.

With the above processings, the background video displayed on the TV monitor 1 and the orchestral accompaniment produced from the loudspeaker 2 are harmonized. Stored in the video disk 4A are only the background video data D3 which are isolated from the song text data 20, so the background video displayed on the screen of the TV monitor 1 is not directly related to the song text displayed thereon and to the music outputted from the loudspeaker 2. Accordingly, with the replacement of the video disk 4A, the user can select a desired background video with respect to the song he selected.

As described, the song text displayed together with the background video is stored in the compact disk 3A or the accompaniment/song text data storage means and the background video data are stored in the video disk 4A or the background video data storage means. That is, the song text data source and the background video data source are isolated from each other, so that a desired background video can be selected independently of the song or the song text data. Thus, a different background video can be displayed with respect to the same music, whereby the availability or utility of the entertainment apparatus is improved.

Next, another embodiment of the present invention will be described with reference to FIGS. 7, 8A and 8B.

Figure 7:
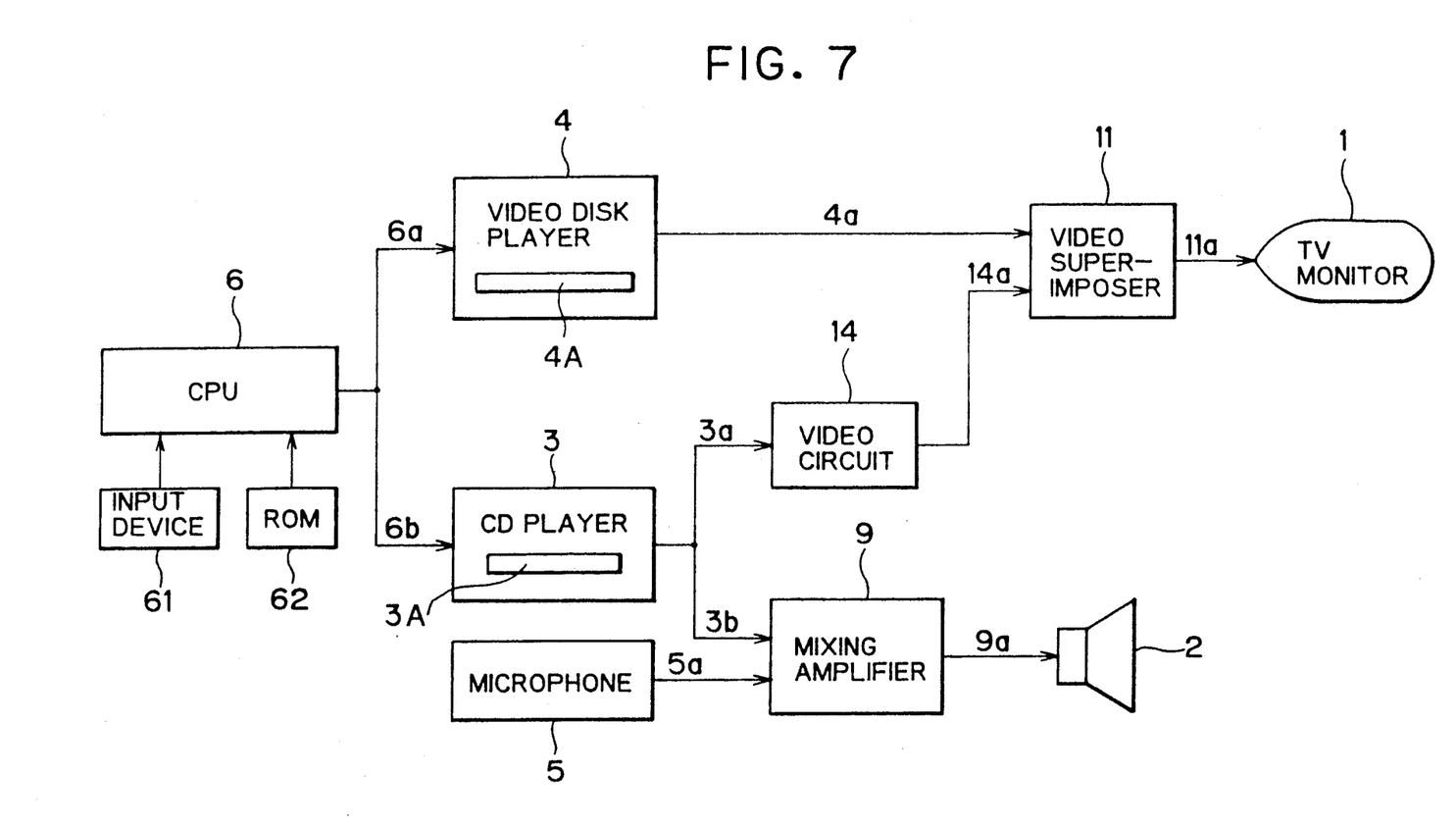
FIG. 7 is a block diagram showing an arrangement of the entertainment apparatus according to another embodiment of the present invention.

FIG. 7 shows in block form an arrangement of the entertainment apparatus which includes a CPU 6 which upon receipt of information regarding a code number and a keyword number allocated to each song through an input device 61 such as a keyboard, performs registration of such information. While referring to data stored in a read-only memory (ROM) 62, the CPU 6 sends a music selection signal 6b to a CD player 3 to instruct selection of the song identified by the code number and sends a search signal 6a to a video disk player 4 to instruct search of a background video identified by the keyword number. As in the first embodiment, the CPU 6 reads background video data out of a video disk 4A and reads accompaniment data and song text data out of a compact disk 3a.

In response to the music selection signal 6b, the CD player 3 reads the song text data 3a and accompaniment data 3b out of the compact disk 3A. The song text data 3a and the accompaniment data 3b are synchronously sent to a video circuit 14 and a mixing amplifier 9, respectively. The video circuit 14 converts the song text data 3a to a song text video signal 14a. The mixing amplifier 9 receives not only the music data 3b but also a voice signal 5a from a microphone 5, mixes and amplifies the music data 3b and the voice signals 5a, and outputs the resultant audio signal 9a to a loudspeaker 2.

The video disk player 4 reads background video data 4a out of the video disk 4A in response to the search signal 6a fed from the CPU 6. In synchronous with the above-described activities performed by the CD player 3, the background video data 4a is sent to a video superimposer 11 where the song text video data 14a is superimposed on the background video data 4a to produce a superimposed video signal 11a. The video signal 11a is outputted to a TV monitor 1.

Next, a music selection operation in the above-described entertainment apparatus will be described with reference to tables shown in FIGS. 8A and 8B. FIG. 8A is a table for making correspondence between keywords 31 and video numbers 32, and FIG. 8B is a table for making correspondence between titles of songs 33 and keyword numbers 34.

Figure 8A:
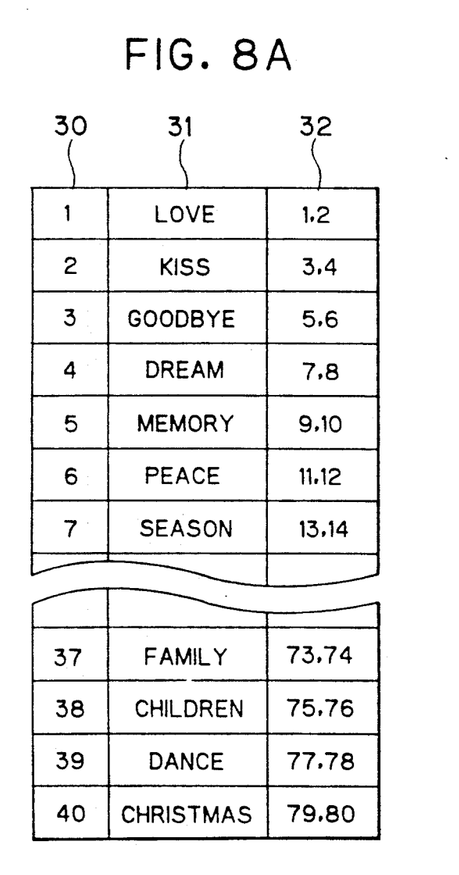
FIG. 8A is a table showing a relation between keywords and video numbers.
Figure 8B:
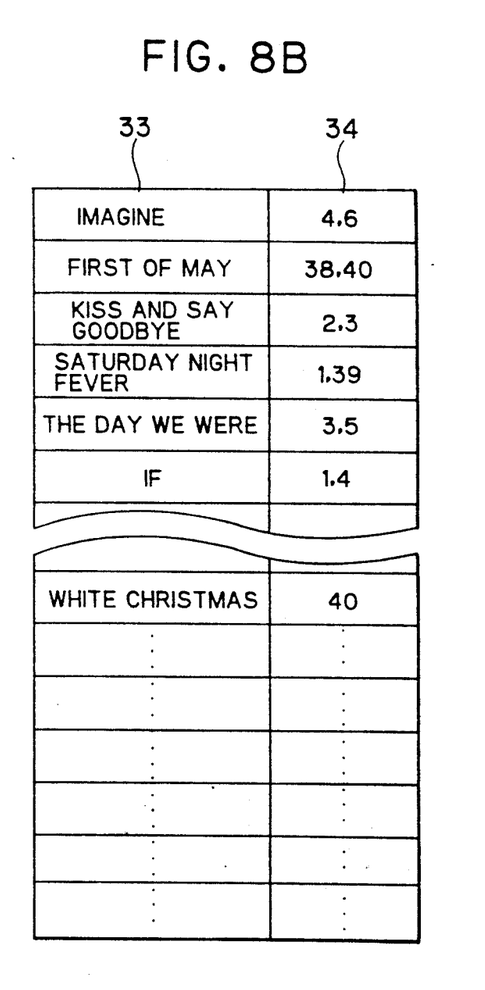
FIG. 8B is a table showing a relation between names of songs and keyword numbers.

The tables shown in FIGS. 8A and 8B are stored in the ROM 62. To categorize songs into a predetermined number of groups depending on characteristics of the songs or the stories of the songs, a correspondence between the video numbers 32 contained in the video disk 4A and keywords 31 representative of the characteristic of the song is prepared in the form of a table as shown in FIG. 8A. Further, a correspondence between the titles of songs 33 and keyword numbers 34 is prepared also in the form of a table as shown in FIG. 8B. With respect to a song designated through the input device 61, a suitable background video is automatically selected from the video disk 4A in accordance with the correlations indicated in those tables.

A plurality of keywords 34 are usually allocated to each song 33, and a plurality of video numbers 32 are allocated to each keyword 31 as shown in FIG. 8A. The song text data 3a and the background video data 4a are not in one-to-one correspondence but one of a plurality of preselected background video data 4a is selectable with respect to a song selected. Accordingly, various background video data can be selectively displayed for the same song. In the table shown in FIG. 8A, two video numbers 32 are listed with respect to each keyword 31. Either one of the two video numbers 32 may be automatically and alternately selected by the CPU 6 or a desired video number may be selected owing to the user's preference.

As described, in response to the signals 6a and 6b from the CPU 6, the background video data 4a is read out from the video disk 4A, and the song text data corresponding to the background video data is read out of the compact disk 3A together with the music data. The song text video signal 14a is superimposed on the background video data 4a in the video superimposer 11. As a result, the song text and the background video are superimposedly displayed on the screen of the TV monitor.

On the other hand, the music data 3b derived from the compact disk 3a and the voice signal 5a from the microphone 5 are mixed together in the mixing amplifier 9 and the resultant audio signal 9a is outputted to the loudspeaker 2 from which singer's voice is produced while being accompanied by orchestral background. The background video and the song text displayed on the screen of the display 1 are related to the music reproduced from the loudspeaker 2.

While the video disk has been described as the source of the video data and the compact disk as the source of orchestral background and song text data, another kinds of media can be employed instead. For example, various kinds of video memories such as a laser disk, a hard disk or CD-ROM, a video tape can be employed in lieu of the video disk. Further, it is possible to employ a magnetic tape or memories storing digital coded data (message) of the format pursuant to MIDI standard in lieu of the compact disk. It is further possible to include data for displaying the song text as the MIDI standard data other than the music data. With the use of such a MIDI data, data can readily be down-loaded to an external device through a communication lines so that the external device may read and reproduce the data. In such a case, even if the apparatus is used for a commercial base, new songs can be added with less running cost.

According to the second embodiment of the present invention, since at least one background video has been preselected in the form of a table stored in the ROM, a pertinent background video can be displayed depending on the song selected. Further, the background video data can also be used for new songs, therefore, it is no longer necessary for the disk manufacturers to prepare new background video for releasing the new song's orchestral background. In addition, since a quantity of data can remarkably be reduced with the omission of the accompanying background videos, it is less expensive for the user to buy new disks. Moreover, a desired orchestral background can be reproduced together with a suitable background video with the apparatus having a simple arrangement. An auto-disk-changer mechanism which has conventionally been used is not required.

While the present invention has been described with respect to specific embodiments, it can be appreciated for those skilled in the art that a variety of changes and modifications may be made without departing from the scope and spirit of the invention. For example, instead of displaying the song text, a musical score or both the musical score and the song text may be superimposedly displayed on the background video.

What is claimed is:

1. An entertainment apparatus comprising:
   accompaniment/song text data storage means for storing accompaniment data and corresponding song text data with respect to each of a plurality of songs;
   background video data storage means for storing a plurality of background video data corresponding to a plurality of background videos, each background video being used in conjunction with a song;
   memory means for storing a table indicating a relationship between at least two song categories and the plurality of songs, the table indicating at least one of the song categories with respect to each of the plurality of songs, the song category indicating at least two preselected background videos preselected from the plurality of background videos;
   input means for an operator to select a song from the plurality of songs;
   control means responsive to the song selected by the operator through said input means and connected to the accompaniment/song text data storage means for reading accompaniment data and its corresponding song text data based on the selected song.
   said control means being connected to said memory means for selecting a background video from the preselected background videos indicated by the song category related to the selected song based on the selected song and the table,
   said control means being further connected to the background video data storage means for reading background video data based on the selected background video;
   audio reproducing means connected to the control means for audibly reproducing the accompaniment data read by said control means;
   video superimposing means connected to at least the control means for superimposing the song text data and background video data read by the control means to produce superimposed video data; and
   display means connected to the video superimposing means for visibly displaying the superimposed video data.

2. The entertainment apparatus according to claim 1, wherein said audio reproducing means comprises:
   a music reproducing unit connected to said control means for receiving the accompaniment data and reproducing an accompaniment signal;
   a microphone for picking up voice and producing a voice signal;
   a mixing amplifier connected to the music reproducing unit and the microphone for mixing and amplifying the accompaniment signal and the voice signal into an audio signal; and
   a loudspeaker connected to said mixing amplifier for outputting the audio signal.

3. The entertainment apparatus according to claim 1, wherein said accompaniment data and the corresponding song text data have a common index number, and wherein said control means reads the accompaniment data and the corresponding song text data based on the common index number.

4. The entertainment apparatus according to claim 1, wherein said accompaniment/song text data storage means is a CD-ROM.

5. The entertainment apparatus according to claim 1, wherein said background video data storage means is a laser video disk.

6. The entertainment apparatus according to claim 1, wherein said background video data storage means is a video tape.

7. The entertainment apparatus according to claim 1, wherein the song categories stored in the table are lesser in number than the plurality of songs stored in the table, and the plurality of background videos are lesser in number than the plurality of songs stored in the table.

8. An entertainment apparatus comprising:

accompaniment/song text data storage means for storing accompaniment data and corresponding song text data with respect to each of a plurality of songs;

background video data storage means for storing a plurality of background video data corresponding to a plurality of background videos, each background video being used in conjunction with a song;

memory means for storing a table indicating a relationship between at least two song categories and the plurality of songs, the table indicating at least one of the song categories with respect to each of the plurality of songs, the song category indicating at least two preselected background videos preselected from the plurality of background videos;

input means for an operator to select a song from the plurality of songs;

control means responsive to the song selected by the operator through said input means and connected to said accompaniment/song text data storage means for reading accompaniment data and its corresponding song text data based on the selected song, said control means being connected to said memory means for determining a song category to which the song selected by the operator belongs and selecting a background video from the preselected background videos corresponding to the song category to which the song selected by the operator belongs, the background video being selected so as to differ with a background video immediately precedingly selected for a song belonging to a same song category, said control means being further connected to the background video data storage means for reading background video data based on the selected background video;

audio reproducing means connected to the control means for audibly reproducing the accompaniment data read by said control means;

video superimposing means connected to at least the control means for superimposing the song text data and background video data read by the control means to produce superimposed video data; and display means connected to the video superimposing means for visibly displaying the superimposed video data.

9. The entertainment apparatus according to claim 8, wherein said audio reproducing means comprises:

a music reproducing unit connected to said control means for receiving the accompaniment data and reproducing an accompaniment signal;

a microphone for picking up voice and producing a voice signal;

a mixing amplifier connected to the music reproducing unit and the microphone for mixing and amplifying the accompaniment signal and the voice signal into an audio signal; and a loudspeaker connected to said mixing amplifier for outputting the audio signal.

10. The entertainment apparatus according to claim 8, wherein said accompaniment data and the corresponding song text data have a common index number, and wherein said control means reads the accompaniment data and the corresponding song text data based on the common index number.

11. The entertainment apparatus according to claim 8, wherein said accompanying/song text data storage means is a CD-ROM.

12. The entertainment apparatus according to claim 8, wherein said background video data storage means is a laser video disk.

13. The entertainment apparatus according to claim 8, wherein said background video data storage means is a video tape.

14. The entertainment apparatus according to claim 13, wherein the song categories stored in the table are lesser in number than the plurality of songs stored in the table, and the plurality of background videos are lesser in number than the plurality of songs stored in the table.

* * * * *